Nov. 25, 1969   M. FICHTER   3,480,859
ELECTRONIC SPEED MEASURING ARRANGEMENT
Filed Dec. 12, 1967   4 Sheets-Sheet 4

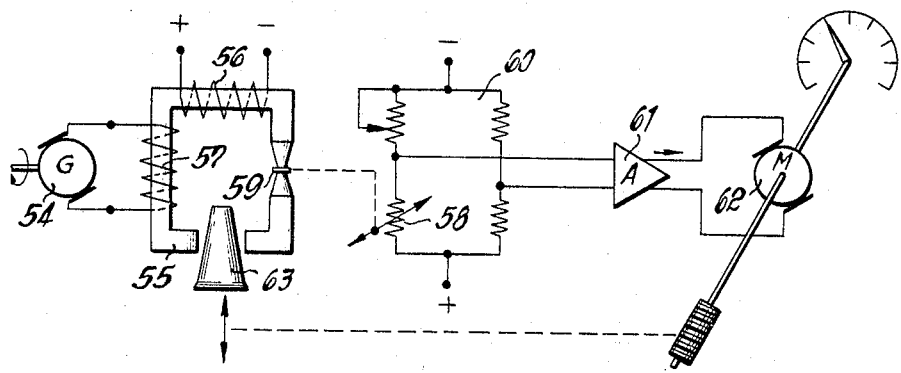
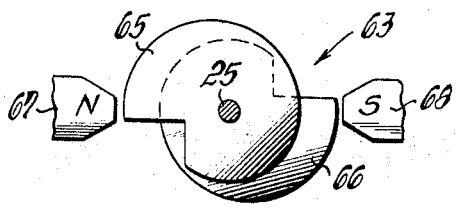
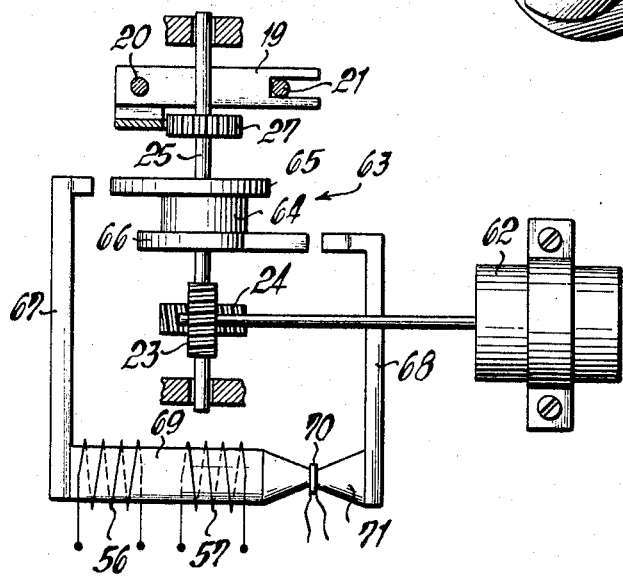

INVENTOR
Manfred FICHTER
By Michael S. Striker,
Attorney

United States Patent Office 3,480,859
Patented Nov. 25, 1969

3,480,859
ELECTRONIC SPEED MEASURING ARRANGEMENT
Manfred Fichter, Weiler, Germany, assignor to Kienzle Apparate GmbH, Villingen, Black Forest, Germany
Filed Dec. 12, 1967, Ser. No. 689,915
Claims priority, application Germany, Dec. 15, 1966, K 60,931
Int. Cl. G01r 11/02
U.S. Cl. 324—70                                                              13 Claims

ABSTRACT OF THE DISCLOSURE

An electronic speed measuring arrangement in which a motor drives to a position corresponding to a signal representative of the speed to be measured. This signal is the input signal to the measuring system. The motor positions a feedback member which converts the mechanical position of the motor into a suitable electrical or magnetic signal adapted for comparison with the input signal. A comparator receives both the input signal and the output signal and compares them through a difference signal. This difference signal representing the difference between the input and output signals is amplified and applied to the motor for driving the latter until the difference signal is null. At this null position of the motor the input and output signals are precisely equal. The comparator is in the form of a magnetic circuit having a constant magnetic flux and a variable magnetic flux or field superimposed upon it. The use of at least one magnetic field dependent resistor within the magnetic circuit provides the desired results in which the output position of the motor corresponds precisely to the input speed signal. The motor can also be used to operate a recorder.

Background of the invention

In arrangements for measuring the rotational speeds of motor vehicles or drive mechanisms of a motor vehicle, it has been found that the principle of compensation is the most advantageous electrical solution to obtaining the desired results. The rotational velocities derived from the motor vehicles may be used to determine the distances travelled through the application of the proper relationships. The compensation principle is especially applicable when the speed parameters are not only to be indicated but also to be recorded.

In the compensation-principle measuring process, the indicated output value is compared to the input signal, and adjustments are made until these two are equal or their difference is null. The recorder used conventionally to measure and indicate the driving conditions of motor vehicles is made independent of the battery of the motor vehicle. The voltage level of the battery in the motor vehicle may vary over a wide range and may be subjected to oscillations and impulses.

In recorders which are used today for traffic regulation it is essential to suppress the influences that such oscillations and impulses may have on the indicating and registering mechanisms. Such suppression may, for example, be accomplished through large positioning torques corresponding to a predetermined inertia of the mechanism. However, this condition may be fulfilled only through the use of a compensating medium.

The requirements of an instrument placed in a motor vehicle, are not confined solely to being unaffected by voltage variations and signal oscillations. It is also of much importance that no substantial delays be incurred through the use of the instrument, and that the insrument have a relatively long life span or operating life. Furthermore, in such instruments the number of structural elements and their relative costs are also of considerable significance.

In a commonly known arrangement the electronic speed measuring instruments for purposes of registering with compensation application, an A.C.-motor is used as the positioning motor because of the lack of a D.C.-motor with long operating life and substantially small delay times. Such an arrangement is described in the German patent application K 38,557 IX/42o. This A.C.-motor actuates, on one hand, the indication and position of the registering medium, and, on the other hand, the resistance measuring bridge used for comparison purposes. The bridge provides the measured signal for the positioning motor through the action of a potentiometer which feeds back the output signal of the positioning motor by converting the mechanical shaft rotation of the motor into a corresponding electrical signal. Aside from the condition that the A.C.-motor requires in addition conversion of the D.C. available in the motor vehicle into A.C., a potentiometer does not meet the operating life requirements which are today placed upon devices or instruments used in conjunction with motor vehicles. The sliding contact of the potentiometer moves along the winding thereof and this mechanical action results in wear of the operating elements of the potentiometer and thus in a reasonably low operating life. Thus, the frictional effects resulting from this relative motion of the sliding contact on the potentiometer winding causes the latter to become non-operative in a relatively short period of time. In addition to this, the potentiometer is a relatively high-cost item.

Accordingly it is an object of the present invention to provide an arrangement for measuring and registering speed characteristics in motor vehicles, and which does not use structural elements having relative sliding motion.

The object is achieved, in accordance with the present invention, by providing a comparator which compares the output value with the input signal. The output and input values are converted into corresponding magnetic field parameters which operate upon a magnetically dependent resistor in the form of a field plate.

In a further embodiment of the present invention, a magnetic circuit is used for the comparator of the compensator. A constant magnetic flux is maintained in this magnetic circuit, and is superimposed by the signal from the output which is fed back. This superposition of signals is accomplished through a variation of an air gap within the magnetic circuit.

The field plates which are used in the magnetic circuit in accordance with the present invention, exhibit a long operating life. Aside from this considerable technical progress results from deriving the D.C. level transformed from a mechanical output value by a process not requiring any physical contact of pairs during the transformation. Furthermore, the measuring instrument, in accordance with the present invention, is designed so that the comparison between the input and output is made by a magnetic circuit using a field plate in the difference path.

Summary of the invention

An electronic speed measuring arrangement in which the input signal representing the speed to be measured is converted to a magnetic field signal. A motor drives to a position which is to correspond to the speed signal being measured. The output position of the motor is converted by an output signal converter into a corresponding magnetic field signal. This output signal in the form of a magnetic field is applied together with the input signal to a comparator which compares the two magnetic field signals. The output of the comparator is a difference or error signal which when amplified drives the motor to the desired position. A resistor variable as a function of the intensity of the magnetic field is used in the circuit to provide the desired results whereby the output motor shaft position corresponds to the input speed signal being measured. The arrangement does not use any sliding contact elements to prolong the operating life of the system and maintain errors derived from that at a minimum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

FIG. 4 is a functional schematic diagram of the arrangement of the present invention, using a magnetic comparator circuit;

FIG. 5 is a functional schematic diagram and shows an embodiment of a magnetic comparator with the design feature in which a member is used for the return path of the magnetic flux to provide particular advantages;

FIG. 6 is a plan view of the ferromagnetic member used as the return path for the magnetic flux in FIG. 5, and shows the geometrical design of this ferromagnetic member;

Description of the preferred embodiments

Figure 1:
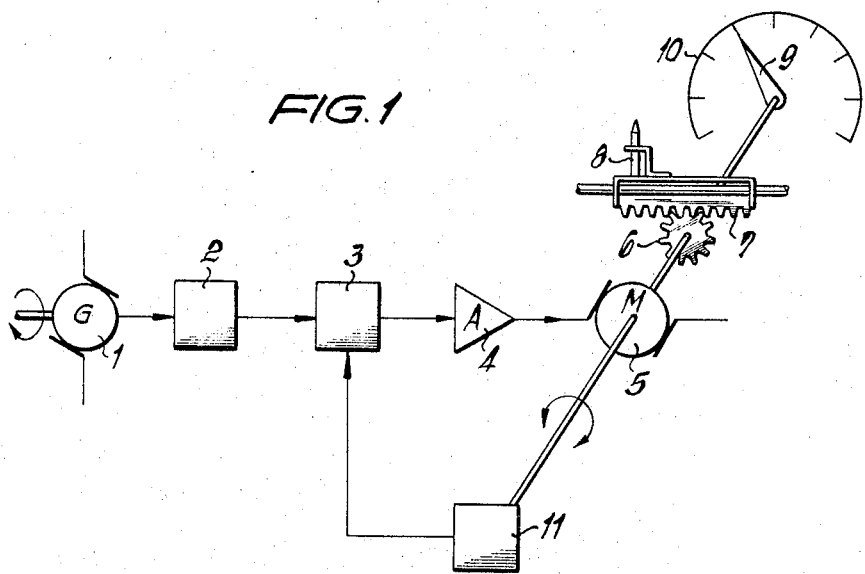
FIG. 1 is a functional block diagram of the arrangement in accordance with the present invention.

Referring to the drawing and in particular to FIG. 1, the input to the arrangement in accordance with the present invention is provided by the device 1 which is, in its simplest form, a tachometer or rate generator. This input member 1 is coupled to the drive or driving mechanism of the motor vehicle. The output of the generator or device 1 is supplied to a signal converter 2 which converts a signal from the device 1 into one that is suitable for application to a comparator 3. The output of the comparator 3 is amplified by an amplifier 4 which, in turn, provides a driving signal to the motor 5. The latter is a D.C.-motor and the amplifier 4 may be constructed as difference amplifier. The motor shaft is coupled to a pinion 6 which positions a gear rack 7. A recording arrangement is secured to the rack 7. In addition, an indicator 9 and scale 10 provide an indication of the position of the shaft of the motor 5. An output converter 11 serves as the feedback element in the circuit and applies a signal to the comparator 3, representative of the state of motor of the motor shaft.

Figure 2:
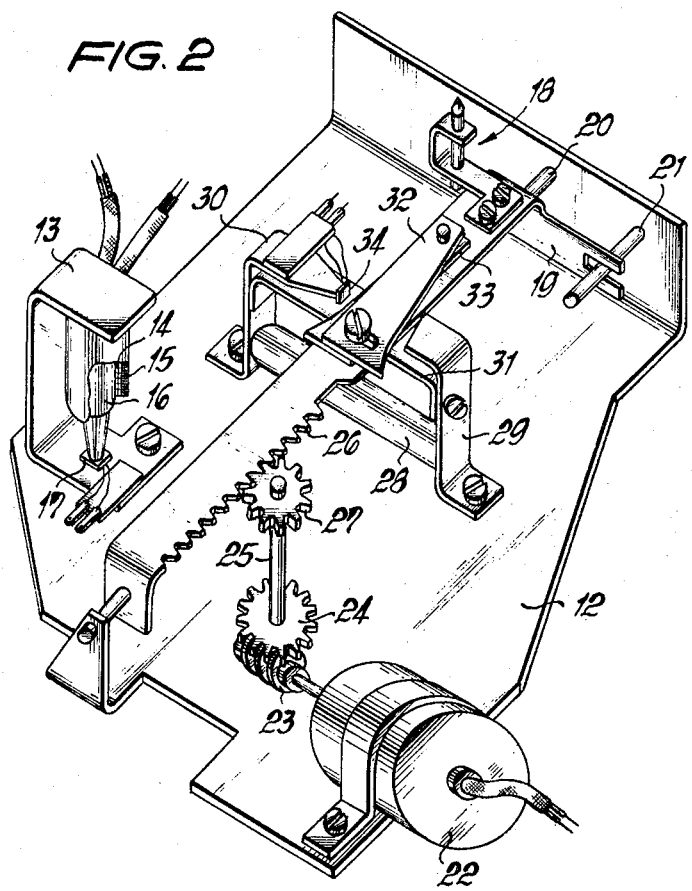
FIG. 2 is an isometric view for converting the input speed signal into the desired form.

The input signal converter 2 is, as shown in FIG. 2, secured to an assembly plate 12 through a housing of the drive recording, not shown. The input signal converter is comprised of a magnetic circuit including a yoke 13, a premagnetizing coil 14, the input transmitting coil 15, the coil core 16, and the shield plate 17 located between the core 16 and the yoke 13. In order to realize a concentration of the magnetic flux at the field plate 17, the core 16 is designed so that it narrows down in the direction toward the field plate 17. The slide member 19 carrying the recording mechanism 18, is slidably supported on the axes or rods 20 and 21 secured to the assembly plate 12. Motion through the slide member 19 is derived from the motor 22 and the transmission linkage comprised of the worm 23, gear 24, connecting shaft 25, pinion 27, and gear rack 26. The motor 22 is preferably a D.C.-motor.

The input signal conversion results from a further permanent magnetic circuit. The latter includes a permanent magnet 28 and two yoke members 29 and 30 which are secured to the non-magnetic plate 12 by means of screws. The yoke members 29 and 30 span the permanent magnet 28 through a bridge member 31 which is also made of non-magnetic material. The two yoke members form an air-gap in which two movable ferromagnetic plates 32 and 33 may slide on the registering slide member 19. The plates 32 and 33 are situated perpendicular to the direction of the magnetic field and serve as the return path for the magnetic flux, and are moved back and forth through the slider motion. The yoke member 30 is also narrowed down at one portion in order to provide for concentration of the magnetic flux. At its end, the yoke member 30 carries the field plate 34. The purpose of the plates 32 and 33 is to provide a proportional relationship between speed variation and corresponding slider motion. Accordingly, these plates are designed of parabolic shape corresponding to the resistance characteristics of the field plate. With this arrangement, any system operation can be linearly indicated over a wide range, through the particular shape and form of the magnetic member forming the return path for the magnetic flux. In special instances, it may be desirable to apply this arrangement for purposes of expanding the indicating region which is possible only through considerable innovation in the case of any current instruments in which the opposing torque is provided by spiral springs, for example.

Figure 3:
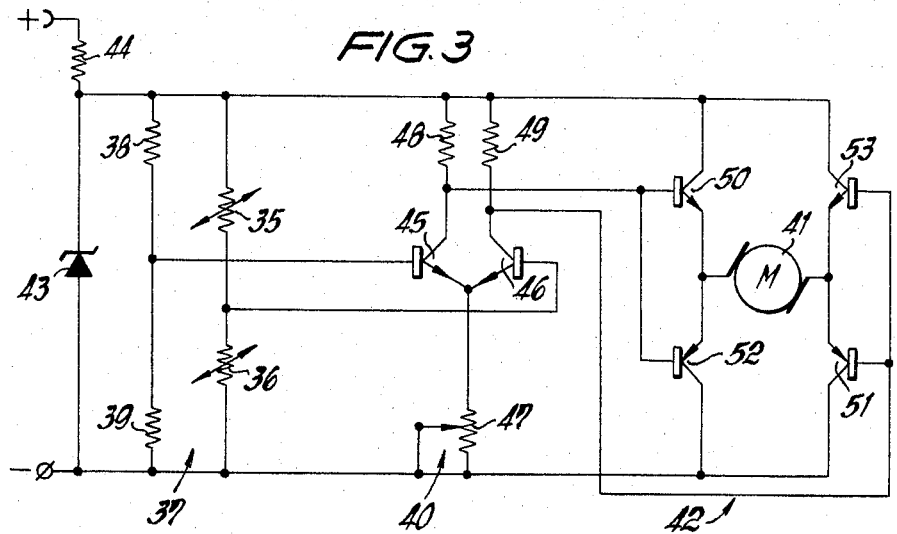
FIG. 3 is an electrical schematic diagram of the comparator and amplifier used to drive the motor, in accordance with the present invention.

The electrical resistances 35 and 36 of the two field plates 17 and 34, respectively, are shown in FIG. 3 in one branch of a measuring bridge 37. The resistance of the field plate 17 is varied in accordance with the input parameter, whereas the input of the field plate 34 is varied in accordance with the output magnitude through the variable magnetic flux. Situated parallel to these variable resistors 35 and 36, in FIG. 3, is another branch of the bridge which includes the comparison resistors 38 and 39. The power supply for the bridge 37 and the difference amplifier 40 as well as the motor 41, is taken from the battery of the motor vehicle. The power supply is regulated and controlled through the Zener diode 43 and the resistor 44 which serves to limit the voltage supply. The supply also serves to energize the recognition circuit 42 containing the motor 41. When a voltage arises in the measuring bridge 37 through a variation in one of the resistors as, for example, resistor 35 corresponding to the desired input value, one of the NPN transistors 45 or 46 of the difference amplifier 40 becomes conducting. The variable resistor 47 serves the purpose of establishing the operating point of both of the resistors 45 and 46. When the measuring bridge is balanced, both of these resistors are conducting. Therefore a positive or negative signal from the measuring bridge 37 gives rise to a positive or negative step signal at the resistors 48 and 49. These step signals turn on, in the recognition circuit 42, the transistors 50 and 51 and, at the same time, turn off the transistors 52 and 53. The opposite arrangement is also possible in which the transistors 52 and 53 are turned on and the transistors 50 and 51 are turned off. As a result, the motor 41 is excited so as to drive in either a forward or backward direction.

The functional schematic diagram of FIG. 4 shows an arrangement in which only one field plate is used. The D.C.-generator 54 provides the input signal which is applied to the magnetic comparison circuit 55 by means of the coil 57. The signal within the coil 57 becomes superimposed upon the constant magnetic flux resulting from the constant energization of the pre-magnetizing coil 56. The electrical resistor 58 corresponding to the field plate 59 lies again in a resistance-measuring bridge 60. The bridge output is connected to a difference amplifier 61 which, in turn, drives the motor 62. The position of the motor is transmitted and inserted into the comparison circuit 55 by means of the coupling to the magnetic member 63. Thus, any variation in the position of the ferromagnetic member 63 causes the reluctance of the magnetic path through the bridge 55 to vary correspondingly and thus provide an indication of the motor position.

As shown by the embodiment of FIG. 5, the member 63 serving as the return path for the magnetic flux consists of two curved discs 65 and 66 rotatable in opposite directions in relation to each other, and displaced from each other through the bearing 64. The curved discs 65 and 66 are secured firmly to the shaft 25 of the intermediate linkage. The motor 62 drives the gear 24 through the worm 23 as shown in FIG. 2. This, in turn, drives the shaft 25 and hence gear 27. As a result, the slider member 19 held by the locating pins 20 and 21 secured to the base or frame of the mechanism, is actuated. The curved disc member 65 operates in conjunction with the portion of the yoke member 67. The curved disc member 65, on the other hand, operates in conjunction with a portion 68 of a yoke member of the comparison circuit 55. The magnetic circuit of this comparison circuit is closed through the magnetic core 69, field plate 70, and magnetic resistance 71 which is temperature-sensitive. The magnetic core 69 is narrowed down towards the field plate 70 in order to provide concentration of the magnetic flux. The magnetic core 69 has wound upon it the pre-magnetizing coil 56 as well as the coil 57 to which the input signal is applied.

In the embodiments of FIGS. 2 and 3, temperature compensation is realized through the placement of the two field plate resistances next to each other, so that they are subjected to the same temperature and compensate each other. In the embodiments of FIGS. 4 and 5, on the other hand, such temperature-compensation must be accomplished through a temperature-sensitive resistor element 71.

Figure 7:
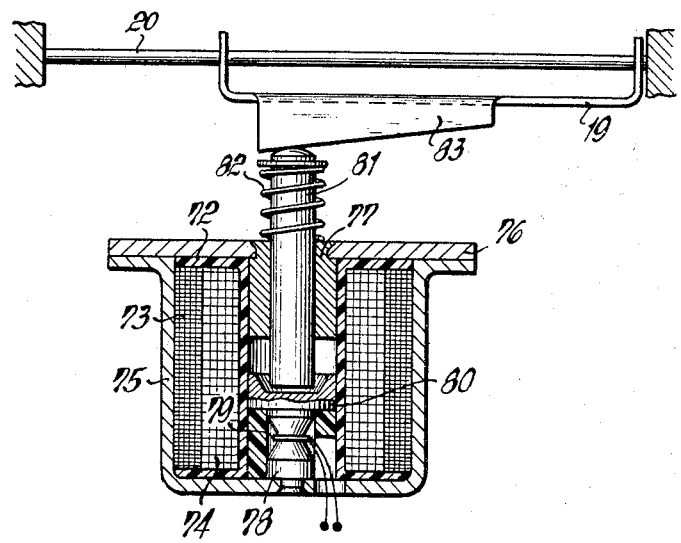
FIG. 7 is an elevational view of an embodiment of the magnetic comparator circuit using an enclosure and cam operating linkage.

In a further embodiment of FIG. 7, the coil member 72 which carries the pre-magnetizing coil 73 as well as a coil 74 to which the input signal is applied, is enclosed by means of a magnetic enclosure 75. The cover 76 in conjunction with the guide bearing or sleeve 77, forms the return path for the magnetic flux. Within the enclosure 75 the magnetic circuit is closed through the post 78, the field plate 79, the intermediate element 80, and the magnetic core 81. The magnetic core 81 also serves as a follower for the cam surface 83 which is secured to the slide member 19. The latter is slidable along the guide rods 20 and 21 as described supra.

Figures 8, 9:
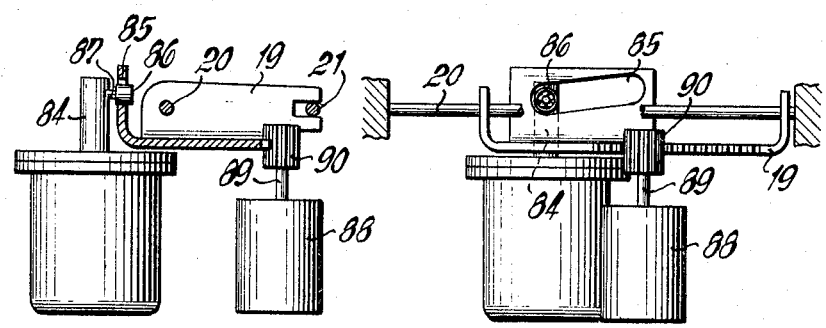
FIGS. 8 and 9 are elevational views of the coupling linkage between the magnetic comparator circuit of FIG. 7 and a registering member indicating the desired output value, in accordance with the present invention.

FIGS. 8 and 9 show embodiments in which a particular advantageous design is realized for the follower and cam combination associated with the magnetic core. Thus, the magnetic core 84, in FIGS. 8 and 9, is secured against rotation by having a roller follower 86 operate within a slot 85 cut within the slide member 19. Accordingly, the slot 85 serves as a guide for the follower 86 in the manner in which frictional effects are maintained at a minimum, and the magnetic core 84 is restrained from being rotated through the action of the cam 83, in FIG. 7. The roller follower 86 is mounted upon a bearing shaft or pin 87 secured to the magnetic core 84.

If, now, a signal is applied to the coil 74, the magnetic flux through the field plate 79 is increased. As a result, the electrical resistance of the field plate 79 varies. The operating point of the field plate may be adjusted by means of the pre-magnetization within the coil 73. The resistance of the field plate lies in a branch of a bridge circuit, as described above in relation to FIG. 4. The diagonal voltage of the bridge resulting from any unbalance of the bridge through the field plate resistance, is amplified for the purpose of driving the motor 88. Through the shaft 89 and the design in which a rack 90 is cut on the slider member 19, the slider and the magnetic core 84 are positioned and actuated by the motor 88. In the quiescent stage of the magnetic comparison system, the magnetic core 84 has a predetermined separation from the intermediate element 80 for the purpose of determining the null point. The null point may be attained by shifting the magnetic system through the slider arrangement or through the use of a magnetic core 84 which is of variable length. Within the region of measurement, one end of the magnetic core 84 moves in a ball-shaped recess of the intermediate element 80. With this particular design of the intermediate element, the operating characteristics of the magnetic system may be linearized. The implication of such linearization is that the sensitivity of the system may be held substantially constant over the entire operating region. As a result, the cam surface on the portion 83, as well as the slot 85 may be designed along substantially straight lines, representing linear cam surfaces.

The matching of the resistor characteristics of the field plate is thereby, not required. This is because the magnetic comparison system always operates on a constant magnetic flux and at a point of the resistor characteristics depending on the pre-magnetization.

The advantage of the closed magnetic system resides in the condition that the latter does not become substantially influenced by stray fields, and that the relationships of these stray fields can be maintained constant and reproducible.

It will be understood that each of the elements described above, or two or more together, may also find a useful application in other types of electronic speed measuring arrangements.

While the invention has been illustrated and described as embodied in an electronic speed measuring arrangement, it is not intended to be limited to the details shown, since various modifications and structural changes may be made without departing in any way from the spirit of the present invention.

What is claimed as new and desired to be protected by Letters Patent is set forth in the appended claims:

1. An electronic speed measuring arrangement comprising, in combination, input signal means transmitting a signal representative of the speed to be measured, means responsive to said input signal means for producing a first magnetic field signal proportional to the signal representative of the speed to be measured; motor means adapted to assume an output position corresponding to the magnitude of said signal representing said speed to be measured; output signal means controlled by said motor means to convert said output position of said motor into a corresponding second magnetic field signal; comparator means connected to said input signal means and said output signal means for comparing the first and second magnetic field signals therefrom; amplifying means connected to the output of said comparator means and to said motor means for amplifying the difference signal from said comparator means and applying the amplified signal to said motor means for driving the same; said comparator means including magnetic field dependent resistor means acted upon by said first and second magnetic field signals so that the difference signal from said comparator means causes said motor means to drive to the position where said magnetic field signals are equal; and means actuated by said motor means proportional to the speed to be measured.

2. The electronic speed measuring arrangement as defined in claim 1, wherein said comparator means comprises a measuring bridge and in which said magnetic field dependent resistor means comprise two magnetic field dependent resistors connected in series in a branch of said bridge, one of said resistors being effected by the magnetic field signal corresponding to said input signal, and the other one of said resistors being effected by the magnetic field signal corresponding to the output position of said motor.

3. The electronic speed measuring arrangement as defined in claim 1, including a ferromagnetic member for providing a return path for magnetic flux through said comparator means said ferromagnetic member being adjusted by said motor means.

4. The electronic speed measuring arrangement as defined in claim 3, wherein said ferromagnetic member for providing said return path for said magnetic flux comprises two magnetically conductive plates movable in opposite directions with respect to each other and linked to said motor means.

5. The electronic speed measuring arrangement as defined in claim 4, wherein the poles of the magnetic circuit corresponding to said ferromagnetic member have a parabolic shape.

6. The electronic speed measuring arrangement as defined in claim 5, wherein said means actuated by said motor means includes a disk-type recording means having a radial registering region, the length of said plates of said ferromagnetic member being at least as long as the length of said radial registering region.

7. The electronic speed measuring arrangement as defined in claim 6, wherein said ferromagnetic member comprises two curved disk members corresponding to the resistance characteristic of said magnetic field dependent resistor means, said curved disk members being adjustable in opposite directions with respect to each other on an intermediate shaft between said motor means and said recording means.

8. The electronic speed measuring arrangement as defined in claim 7, wherein said magnetic field dependent resistor means is mounted upon said recording means.

9. The electronic speed measuring arrangement as defined in claim 1, wherein said comparator means includes a magnetic circuit having a constant magnetic flux therethrough with said second magnetic field superimposed thereon.

10. The electronic speed measuring arrangement as defined in claim 9, including variable magnetic air gap means in said magnetic circuit for superimposing said second magnetic field signal.

11. The electronic speed measuring arrangement as defined in claim 10, wherein said magnetic field dependent resistor means provides an electrical signal representing the magnetic flux through said magnetic circuit.

12. The electronic speed measuring arrangement as defined in claim 11, wherein said variable air gap means includes a moveable core.

13. The electronic speed measuring arrangement as defined in claim 12, wherein said variable air gap means includes a post having a narrowed-down portion in its cross-section operating in conjunction with said magnetic core means.

References Cited

UNITED STATES PATENTS

| | | | |
|---|---|---|---|
| 2,906,945 | 9/1959 | Weiss | 324—117 |
| 3,029,022 | 4/1962 | Horvath | 324—69 |
| 3,229,202 | 1/1966 | Werk | 324—70 |
| 3,317,829 | 5/1967 | Kuhrt | 324—70 |

RUDOLPH V. ROLINEC, Primary Examiner

MICHAEL J. LYNCH, Assistant Examiner

U.S. Cl. X.R.

317—5; 324—99